Figure 1:
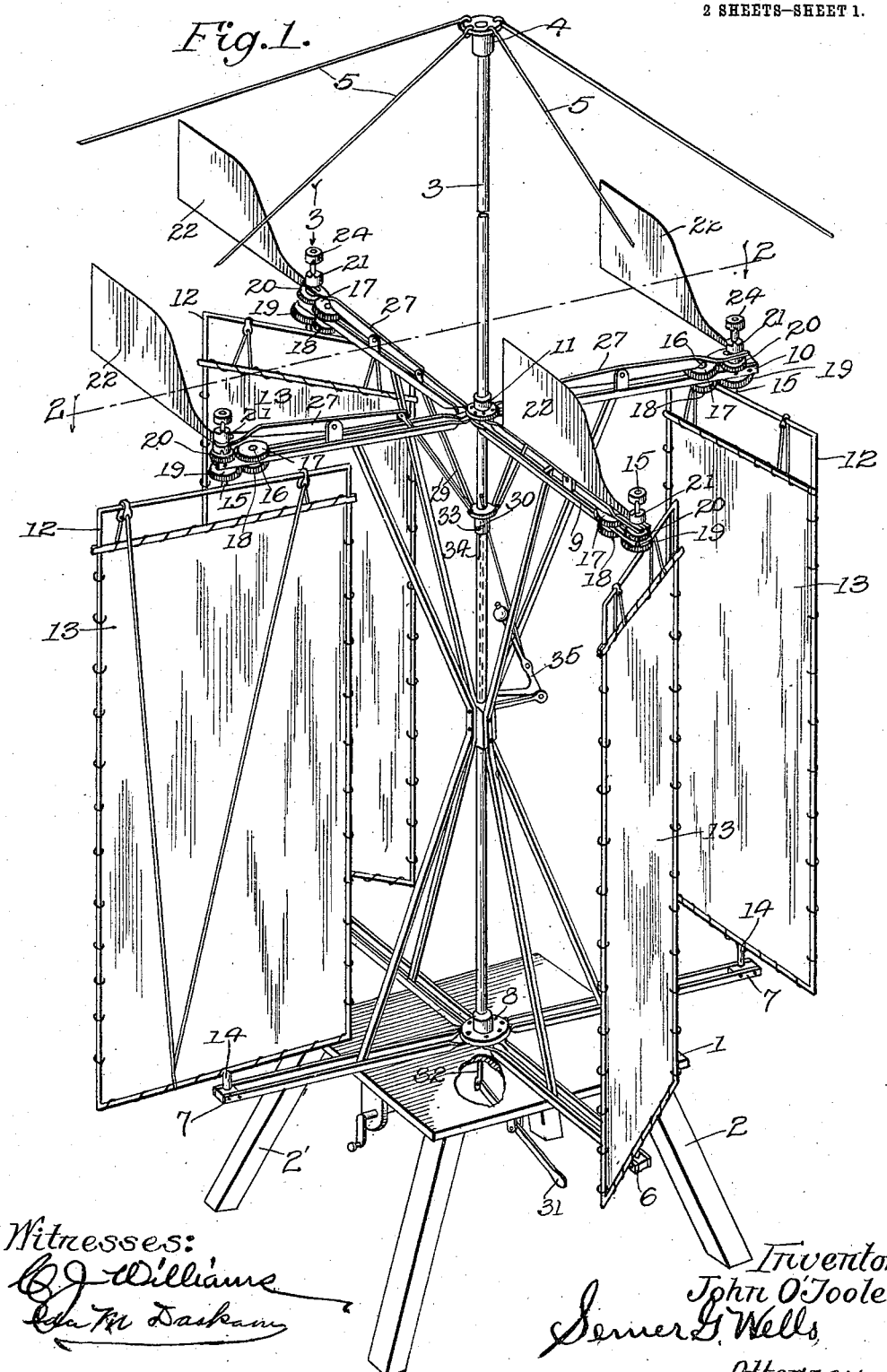

J. O'TOOLE.
WINDMILL.
APPLICATION FILED MAY 3, 1910.

987,645.

Patented Mar. 21, 1911.
2 SHEETS—SHEET 1.

Witnesses:
C. J. Williams
Ida M. Daskam

Inventor,
John O'Toole
Semer G. Wells
Attorney.

J. O'TOOLE.
WINDMILL.
APPLICATION FILED MAY 3, 1910.
987,645.
Patented Mar. 21, 1911.
2 SHEETS—SHEET 2.
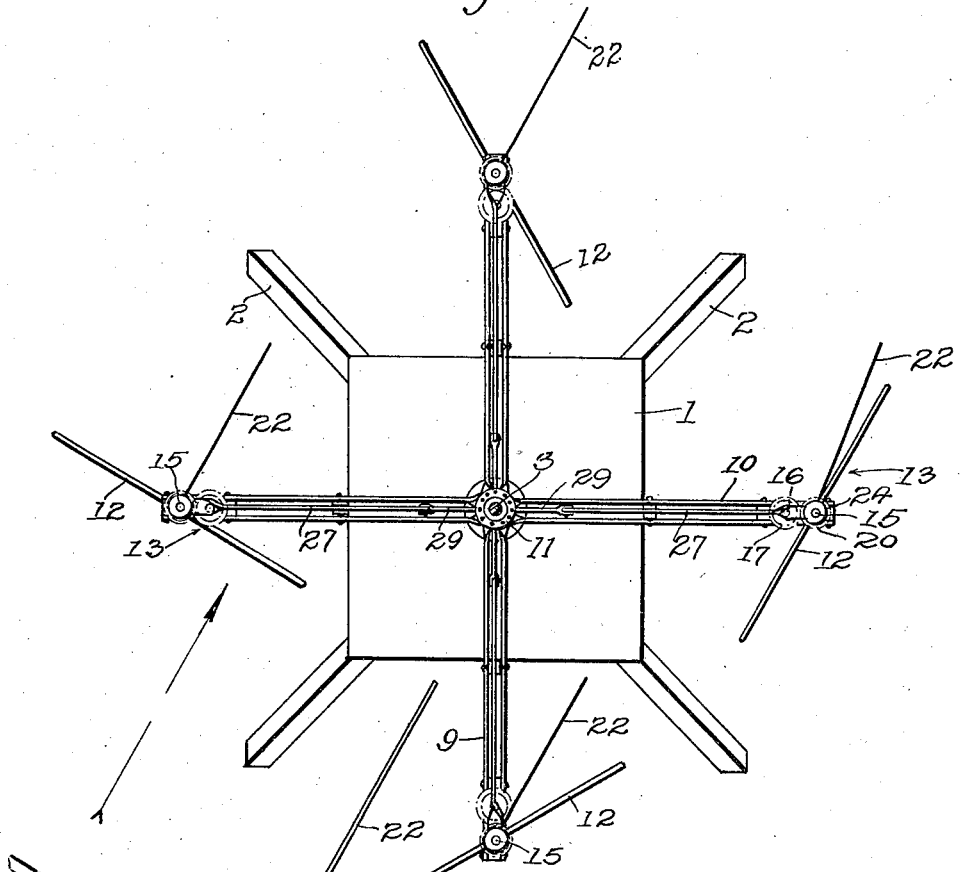
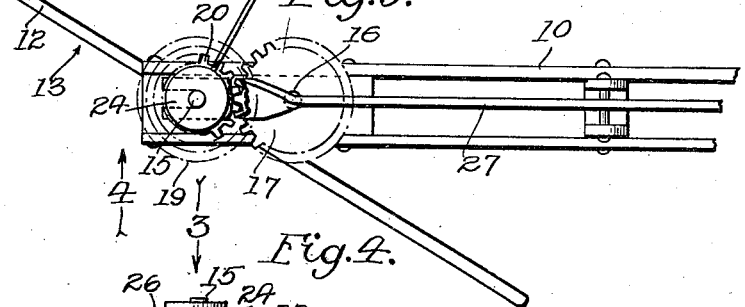
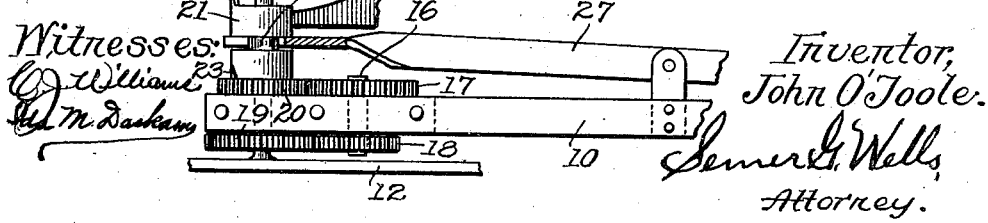
Witnesses:
O. J. Williams
M. Daskam
Inventor,
John O'Toole.
Semer G. Wells,
Attorney.

UNITED STATES PATENT OFFICE.

JOHN O'TOOLE, OF COLEGROVE, CALIFORNIA.

WINDMILL.

987,645.  Specification of Letters Patent.  Patented Mar. 21, 1911.

Application filed May 3, 1910. Serial No. 559,148.

*To all whom it may concern:*

Be it known that I, JOHN O'TOOLE, a citizen of the United States, residing at Colegrove, California, have invented a new and useful Windmill, of which the following is a specification.

My invention relates to horizontal feathering blade wind wheels, and my object is to improve the construction shown in my United States Patent No. 641,143, dated January 9th, 1900.

In the former patent I provide a system of chain gearing for feathering the wind wheels and in my present invention I substitute for this chain gearing wind vanes connected to the feathering blades by reducing gearing so that the wind vanes automatically feather the blades.

In the drawings: Figure 1 is a perspective of a wind wheel employed in a wind-mill embodying the principles of my invention. Fig. 2 is a horizontal section on the line 2—2 of Fig. 1, and looking downwardly. Fig. 3 is an enlarged top plan view of one of the wind blades with the feathering vane and geared connection as indicated by the arrow 3 in Figs. 1 and 4. Fig. 4 is a side elevation of the parts shown in Fig. 3.

Referring to the drawings in detail the platform 1 is horizontally mounted upon the top of the tower post 2. The hollow shaft 3 extends vertically through a bearing in the platform 1 and is supported by said bearing. A bearing 4 is mounted upon the upper end of the shaft 3 and cords 5 are attached to the bearing 4 and to suitable supporting means not shown, so as to hold the shaft 3 upright. Arms 6 and 7 extend horizontally and radially from the hub 8 fixed upon the shaft 3 above the bearing in the platform 1, and corresponding arms 9 and 10 extend horizontally and radially from the hub 11 fixed upon the shaft 3, there being in an ordinary windmill about ten feet of space between the hubs 8 and 11. The feathering blades have rectangular open frames 12 upon which are stretched canvas coverings 13. Pintles 14 extend downwardly from the floor ends of the frames into bearings in the ends of the arms 6 and 7, and pintles 15 extend upwardly from the upper ends of the frames through bearings in the ends of the arms 9 and 10, said pintles 14 and 15 being in vertical alinement and at the transverse centers of the blades. Countershafts 16 are mounted in bearings parallel with the pintles 15, there being spur gears 17 and 18 fixed upon the countershafts. Spur gears 19 are fixed upon the pintles 15 in mesh with the gear 18 and spur gears 20 are loosely mounted upon the pintles 15 in mesh with the gears 17. The wind vane heads 21 are loosely mounted upon the pintles 15 above the gears 20 and the wind vanes 22 are rigidly fixed to the heads 21. Clutch teeth 23 extend upwardly from the gears 20 to engage in clutch recesses in the lower faces of the heads 21. Clutch heads 24 are rigidly fixed upon the upper ends of the pintles 15 and clutch teeth 25 extend upwardly from the wind vane heads 21 to engage the clutch recesses 26 in the heads 24, there being sufficient space between the upper faces of the gears 20 and the lower faces of the clutch heads 24 to allow the wind vane heads 21 to move out of engagement with the gears 20 before passing into engagement with the clutch heads 24. Operating levers 27 are pivotally mounted upon and substantially parallel with the arms 9 and 10, the outer ends of the levers being bifurcated to pass into grooves 28 in the wind vane heads 21 and links 29 connect the inner ends of the levers to the head 30 slidingly mounted upon the shaft 3. A hand lever 31 is mounted below the platform 1 and a rod 32 extends upwardly from one end of the hand lever 31 through the shaft 3 and a pin 33 is inserted horizontally through the head 30, through slots 34 in the shaft 3, and through the upper end of the rod 32, so that by manipulating the hand lever 31 the wind vane heads 21 may be clutched to the gears 20 or to the clutch heads 24.

The governor mechanism 35 is connected to the sliding head 30 for automatically operating the wind vane heads 21. The governor mechanism 35 consists of an arm extending horizontally from the central frame work, a lever pivoted to the outer end of the arm and extending upwardly, a ball mounted on the upper end of the pivoted lever and a connecting rod connecting the pivoted lever to the throw-off mechanism, so that the governor will operate the throw-off mechanism when the centrifugal force is too great.

When the wind vane heads are clutched to the gears 20 they are connected to the frames of the feathering blades by reducing gearing, the relative proportions of the gears 17, 18, 19 and 20 being such that a complete rotation of the gear 20 produces half a revolution of the gear 19. The clutch teeth 25 and the clutch recess 26 are so arranged that the heads 21 will only be clutched to the heads 24 when the vanes 22 are parallel with the feathering blades, so that the action of the vanes 22 will hold the blades edgewise to the wind and the clutch teeth 23 are so arranged relative to the grooves in the lower ends of the heads 21 that when one blade is square across the wind as in Fig. 2 the next blade will be diagonal and going with the wind, the next vane will be straight with the wind and the next one will be diagonal.

The surface of the wind vanes is sufficient to overbalance the wind blades so that the positions of the wind blades are controlled by the wind vanes, and by gearing the connections between the vanes and blades two to one each blade will turn half around at a complete revolution of a wind wheel. Each feathering blade is mounted and operated independent of each of the other feathering blades, so that the feathering blades need not be parallel with each other, or influenced by each other. In other words each feathering blade is yieldingly mounted upon its axis, and it is thought that there is a great advantage in this construction over the former constructions where the feathering blades were chained together.

I claim:

1. In a windmill, a horizontal wind wheel having feathering wind blades mounted on vertical axes, wind vanes mounted loosely upon the axes of the wind blades and a train of gearing connecting the wind blades and the wind vanes, so that when the wind vanes are held by the wind and the wind wheel travels, the wind blades make a half revolution during each circuit of their orbit.

2. In a windmill, a horizontal wind wheel having feathering wind blades mounted on vertical axes, wind vanes mounted loosely upon the axes of the wind blades, counter-shafts mounted parallel with the axes of the wind blades, gears upon the axes of the wind blades, gears upon the counter-shafts meshing with the gears upon the wind blades, gears upon the wind vanes and gears upon the counter-shafts meshing with the gears upon the wind vanes, so that the wind blades make half a revolution at each circuit of their orbit.

3. In a windmill, a horizontal wind wheel having feathering wind blades mounted on vertical axes, wind vanes mounted loosely upon the axes of the wind blades, counter-shafts mounted parallel with the axes of the wind blades, gears upon the axes of the wind blades, gears upon the counter-shaft meshing with the gears upon the wind blades, gears upon the wind vanes and gears upon the counter-shafts meshing with the gears upon the wind vanes, so that the wind blades make half a revolution at each circuit of their orbit, and means of throwing the wind vanes in and out of gear.

JOHN O'TOOLE.

Witnesses:
 IDA M. DASKAM,
 HELEN SOHNS.

---

Copies of this patent may be obtained for five cents each, by addressing the "Commissioner of Patents, Washington, D. C."